United States Patent
Xiong

(10) Patent No.: US 11,855,957 B2
(45) Date of Patent: Dec. 26, 2023

(54) DISCOVERY METHOD AND APPARATUS FOR DNS SERVER, COMPUTER DEVICE, COMPUTER-READABLE STORAGE MEDIUM AND COMPUTER PROGRAM PRODUCT

(71) Applicant: Tencent Technology (Shenzhen) Company Limited, Shenzhen (CN)

(72) Inventor: Chunshan Xiong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/990,555

(22) Filed: Nov. 18, 2022

(65) Prior Publication Data
US 2023/0079974 A1 Mar. 16, 2023

Related U.S. Application Data

(63) Continuation of application No. PCT/CN2022/078402, filed on Feb. 28, 2022.

(30) Foreign Application Priority Data

May 8, 2021 (CN) .......................... 202110502345.7

(51) Int. Cl.
*G06F 15/16* (2006.01)
*H04L 61/4511* (2022.01)
(Continued)

(52) U.S. Cl.
CPC .......... *H04L 61/4511* (2022.05); *H04L 61/10* (2013.01); *H04L 61/5014* (2022.05)

(58) Field of Classification Search
USPC .................................................. 709/203, 245
See application file for complete search history.

(56) References Cited

U.S. PATENT DOCUMENTS

| 10,489,231 B1* | 11/2019 | Gabay ................. G06F 11/0784 |
| 2010/0332680 A1* | 12/2010 | Anderson ........... H04L 61/4511 |
| | | 709/245 |

(Continued)

FOREIGN PATENT DOCUMENTS

| CN | 111107171 A | 5/2020 |
| CN | 112422701 A | 2/2021 |

(Continued)

OTHER PUBLICATIONS

Tencent Technology, ISR, PCT/CN2022/078402, dated Apr. 29, 2022, 3 pgs.

(Continued)

*Primary Examiner* — Duyen M Doan
(74) *Attorney, Agent, or Firm* — Morgan, Lewis & Bockius LLP

(57) ABSTRACT

A discovery method for a domain name system (DNS) server includes transmitting a DNS query to a local protocol data unit session anchor (L-PSA). The DNS query carries an IP address of a first DNS server edge application server discovery function (EASDF). The method includes, in accordance with a determination that the first DNS server EASDF satisfies an unavailability condition, transmitting a first dynamic host configuration protocol (DHCP) request to a session management function (SMF). The first DHCP request is used for obtaining an IP address of a second DNS server. The method includes receiving a first DHCP response carrying an IP address of the second DNS server assigned by the SMF.

20 Claims, 10 Drawing Sheets

(51) Int. Cl.
  *H04L 61/5014*  (2022.01)
  *H04L 61/10*  (2022.01)

(56) References Cited

U.S. PATENT DOCUMENTS

| | | | | |
|---|---|---|---|---|
| 2022/0141176 A1* | 5/2022 | Padebettu | ............ | H04W 76/12 |
| | | | | 370/389 |
| 2022/0263788 A1* | 8/2022 | Lee | .................... | H04L 61/4511 |
| 2022/0321475 A1* | 10/2022 | Thiebaut | ................ | H04L 47/11 |
| 2022/0377046 A1* | 11/2022 | Zhang | .................... | H04L 67/51 |

FOREIGN PATENT DOCUMENTS

| | | | |
|---|---|---|---|
| CN | 112468604 A | 3/2021 | |
| CN | 113206894 A | 8/2021 | |
| KR | 20180094644 A | 8/2018 | |
| WO | WO 2017000128 A1 | 1/2017 | |
| WO | WO 2020207490 A1 | 10/2020 | |
| WO | WO 2021043191 A1 | 3/2021 | |

OTHER PUBLICATIONS

Huawei, "Updating Option C of EAS Discovery Procedure with Local DNS server", S2-2102491, 3GPP TSG-WG SA2 Meeting #144E e-meeting, Elbonia, Apr. 12-16, 2021, 3 pgs.
Tencent, "EASDF Discovery via DHCP", S2-2102718, SA WG2 Meeting #144E, Elbonia, Apr. 12-Apr. 16, 2021, 5 pgs.
Tencent, "EASDF Discovery via DHCP", S2-2102718r01, SA WG2 Meeting #144E, Elbonia, Apr. 12-Apr. 16, 2021, 5 pgs.

\* cited by examiner

DISCOVERY METHOD AND APPARATUS FOR DNS SERVER, COMPUTER DEVICE, COMPUTER-READABLE STORAGE MEDIUM AND COMPUTER PROGRAM PRODUCT

CROSS-REFERENCE TO RELATED APPLICATIONS

This application is a continuation application of PCT Patent Application No. PCT/CN2022/078402, entitled "DNS SERVER DISCOVERY METHODS, DEVICES, COMPUTER EQUIPMENT, COMPUTER-READABLE STORAGE MEDIA AND COMPUTER PROGRAM PRODUCTS" filed on Feb. 28, 2022, which claims priority to Chinese Patent Application No. 202110502345.7, filed with the State Intellectual Property Office of the People's Republic of China on May 8, 2021, and entitled "DNS SERVER DISCOVERY METHODS, DEVICES, COMPUTER EQUIPMENT, COMPUTER-READABLE STORAGE MEDIA AND COMPUTER PROGRAM PRODUCT", all of which are incorporated herein by reference in their entirety.

FIELD OF THE TECHNOLOGY

Embodiments of this application relate to the field of mobile communication, and specifically to a discovery method and apparatus for a DNS server, a computer device, a computer-readable storage medium and a computer program product.

BACKGROUND OF THE DISCLOSURE

A 5th generation mobile communication technology core (5GC) network supports using protocol data unit (PDU) session to support edge computing.

In edge computing, a domain name system (DNS) query transmitted by user equipment (UE) is processed by an edge application server discovery function (EASDF). To implement session offloading, a session management function (SMF) inserts an uplink classifier/branching point (UL CL/BP) and reassigns a DNS server to the UE.

However, the SMF transmits information about a new DNS server to the UE through a non-access stratum (NAS), so requirements of a split-UE cannot be satisfied. That is, since the split-UE is a mobile equipment (ME) and a terminal equipment (TE) is a split-UE, a DNS discovery process based on the NAS can only reach the ME, but cannot reach the TE connected to the ME, so that the TE cannot obtain a reassigned new DNS server. How to rediscover a DNS server for a DNS query is an unsolved technical problem.

SUMMARY

Embodiments of this application provide a discovery method and apparatus for a DNS server, a computer device and a storage medium, and provide a discovery method for a DNS server based on a user plane (UP). The technical solutions are as follows:

An embodiment of this application provides a discovery method for a DNS server, including:

transmitting a DNS query to a local protocol data unit session anchor (L-PSA), the DNS query carrying an Internet Protocol (IP) address of a first DNS server EASDF;

in accordance with a determination that the first DNS server EASDF satisfies an unavailability condition, transmitting a first dynamic host configuration protocol (DHCP) request to an SMF, the first DHCP request being used for obtaining an IP address of a second DNS server; and receiving a first DHCP response, the first DHCP response carrying an IP address of the second DNS server assigned by the SMF.

An embodiment of this application provides an assignment method for a DNS server, applicable to an SMF, the method including:

receiving a first DHCP request, the first DHCP request being forwarded, in accordance with a determination that a first DNS server EASDF satisfies an unavailability condition, by UE through an L-PSA to the SMF, and the first DHCP request being used for obtaining an IP address of a second DNS server;

determining at least one candidate DNS server connected to the L-PSA in response to receiving the first DHCP request;

determining the second DNS server in the at least one candidate DNS server, the second DNS server being a DNS server assigned to the UE; and transmitting a first DHCP response to the UE, the first DHCP response carrying the IP address of the second DNS server.

An embodiment of this application provides a discovery apparatus for a DNS server, including:

a transmitting module, configured to transmit a DNS query to an L-PSA, the DNS query carrying an IP address of a first DNS server EASDF; and configured to transmit, in accordance with a determination that the first DNS server EASDF satisfies an unavailability condition, a first DHCP request to an SMF, the first DHCP request being used for obtaining an IP address of a second DNS server; and a receiving module, configured to receive a first DHCP response, the first DHCP response carrying an IP address of the second DNS server assigned by the SMF.

According to another aspect of this application, an assignment apparatus for a DNS server is provided, including:

a receiving module, configured to receive a first DHCP request, the first DHCP request being forwarded, in accordance with a determination that a first DNS server EASDF satisfies an unavailability condition, by UE through an L-PSA to the SMF, and the first DHCP request being used for obtaining an IP address of a second DNS server;

a determining module, configured to determine at least one candidate DNS server connected to the L-PSA in response to receiving the first DHCP request;

the determining module, further configured to determine the second DNS server in the at least one candidate DNS server, the second DNS server being a DNS server assigned to the UE; and a transmitting module, configured to transmit a first DHCP response to the UE, the first DHCP response carrying the IP address of the second DNS server.

An embodiment of this application provides a computer device, including: a processor and a memory, the memory storing a computer program, the computer program being loaded and executed by the processor to implement the discovery method for a DNS server or the assignment method for a DNS server described above.

An embodiment of this application provides a non-transitory computer-readable storage medium, storing a computer program, the computer program being loaded and executed by a processor to implement the discovery method for a DNS server or the assignment method for a DNS server described above.

An embodiment of this application provides a computer program product, the computer program product including computer instructions, the computer instructions being stored in a computer-readable storage medium. A processor of a computer device reads the computer instructions from the computer-readable storage medium, and executes the computer instructions, so that the computer device performs the discovery method for a DNS server or the assignment method for a DNS server according to the foregoing aspects.

An embodiment of this application provides a chip, configured to perform the discovery method for a DNS server or the assignment method for a DNS server according to the foregoing aspects.

The technical solutions provided in the embodiments of this application include at least the following beneficial effects:

In accordance with a determination that the first DNS server EASDF satisfies an unavailability condition, a first DHCP request for obtaining an IP address of the DNS server is transmitted to an SMF. After receiving a first DHCP response, the IP address of the rediscovered second DNS server is obtained. The embodiments of this application is a DHCP-based DNS discovery process, which belongs to a DNS discovery process of an IP layer rather than a DNS discovery process of an NAS. Therefore, the embodiments of this application can solve problems that the UE cannot access an originally assigned EASD through the L-PSA after the UL CL/BP and the L-PSA are inserted and an assigned new DNS server cannot be obtained by the TE in the split UE, so that the TE can obtain the same IP address of the new DNS server through a DHCP-based DNS discovery process as the ME obtains through an NAS-based DNS discovery process, effectively improving the efficiency of discovering the DNS server.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may derive other drawings from these accompanying drawings without creative efforts.

DESCRIPTION OF EMBODIMENTS

Exemplary embodiments are described in detail herein, and examples of the exemplary embodiments are shown in the accompanying drawings. When the following descriptions are made with reference to the accompanying drawings, unless otherwise indicated, the same numbers in different accompanying drawings represent the same or similar elements. The following implementations described in the following exemplary embodiments do not represent all implementations that are consistent with this application. Instead, they are merely examples of the apparatus and method according to some aspects of this application as recited in the appended claims.

"Several" mentioned in this specification means one or more, and "plurality of" means two or more. And/or describes an association relationship for describing associated objects and represents that three relationships may exist. For example, A and/or B may represent the following three cases: Only A exists, both A and B exist, and only B exists. The character "/" generally indicates an "or" relationship between the associated objects.

Edge Computer (EG): Edge computer is to provide cloud services and Internet technology (IT) environment services for application developers and service providers on an edge side of the network. The goal is to provide computing, storage and network bandwidth close to the data input or user. For example, if a game program A is used on the mobile phone of a user, an edge computing server closest to the mobile phone of the user can be assigned to provide a game service, so as to provide the user with a game service with minimal network delay.

Figure 1:
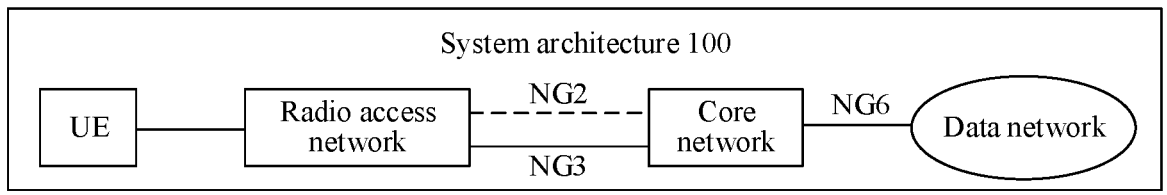
FIG. 1 is a structural block diagram of a communication system according to an embodiment of this application.

FIG. 1 is a schematic architectural diagram of a communication system 100 according to an embodiment of this application. As shown in FIG. 1, the communication system 100 may include: UE, a radio access network (RAN), a core network (CN) and a data network (DN). The UE, the RAN, and the CN are main components of the architecture. Logically, they can be divided into two parts: a user plane and a control plane. The control plane is responsible for the management of a mobile network, and the user plane is responsible for the transmission of service data. In FIG. 1, the NG2 reference point is located between the RAN control plane and the CN control plane, the NG3 reference point is located between the RAN user plane and the CN user plane, and the NG6 reference point is located between the CN user plane and the data network.

User equipment (UE): UE is a portal for mobile users and network interaction, and can provide basic computing capabilities and storage capabilities, display service windows to users, and accept user operation inputs. UE will use a next-generation air interface technology to establish a signal connection and a data connection with the RAN, thereby transmitting control signals and service data to the mobile network.

Radio access network (RAN): RAN is similar to a base station in the traditional network. It is deployed close to the UE to provide a network access function for authorized users within the cell coverage, and can transmit user data using transmission tunnels of different quality according to the level of the user and service requirements. RAN can manage its own resources, utilize the resources rationally, provide an access service for the UE on demand, and forward control signals and user data between the UE and the core network.

Core Network (CN): CN is responsible for maintaining subscription data of the mobile network, managing network elements of the mobile network, and providing functions such as session management, mobility management, policy management, and security authentication for the UE. When the UE is attached, CN provides network access authentication for the UE; when the UE has a service request, CN assigns network resources to the UE; when the UE moves, CN updates network resources for the UE. When the UE is idle, CN provides a fast recovery mechanism for the UE. When the UE is detached, CN releases network resources for the UE. When the UE has service data, CN provides a data routing function for the UE, such as forwarding uplink data to the DN, or receiving downlink data of the UE from the DN, forwarding the data to the RAN, and then transmitting the data to the UE.

Data network (DN): DN is a data network that provides business services for users. Generally, a client is located in the UE, and a server is located in the data network. The data network can be a private network, such as a local area network, or an external network that is not controlled by operators, such as the Internet, or a proprietary network jointly deployed by operators, such as for configuring IP multimedia core network subsystem (IMS) services.

Figure 2:
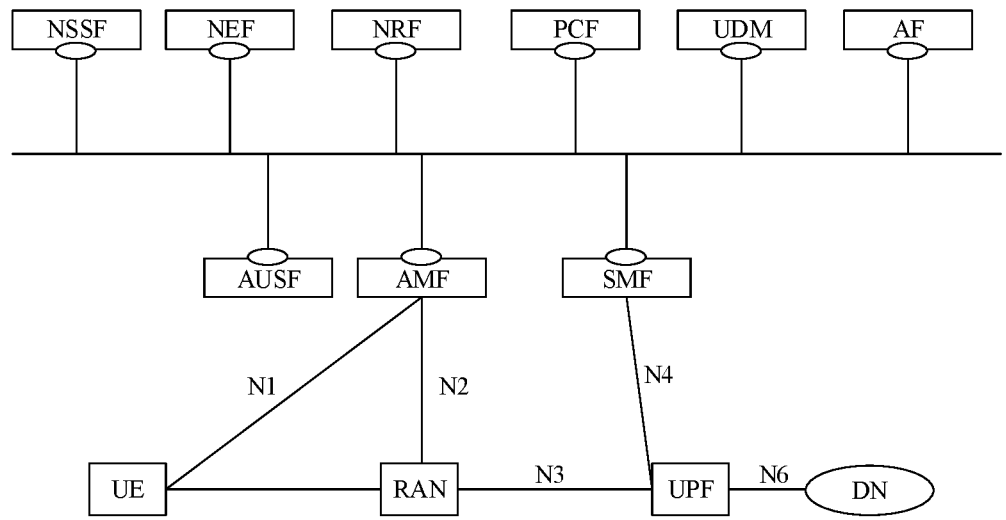
FIG. 2 is a structural block diagram of a communication system according to an embodiment of this application.

FIG. 2 is a detailed architecture determined on the basis of FIG. 1. The core network user plane includes user plane functions (UPFs); and the core network control plane includes an authentication server function (AUSF), an access and mobility management function (AMF), a session management function (SMF), a network slice selection function (NSSF), a network exposure function (NEF), an NF repository function (NRF), a unified data management (UDM), a policy control function (PCF), and an application function (AF). Functions of these function entities are as follows:

User plane functions (UPF): UPF performs user data packet forwarding according to routing rules of SMF.

Authentication server function (AUSF): AUSF performs security authentication of UE.

Access and mobility management function (AMF): AMF is responsible for UE access and mobility management.

Session management function (SMF): SMF is responsible for UE session management.

Network slice selection function (NSSF): NSSF selects network slices for UE.

Network exposure function (NEF): NEF opens network functions to third parties in the form of application program interface (API).

NF repository function (NRF): NRF provides storage function and selection function of network function entity information for other network elements.

Unified data management (UDM): UDM is responsible for user subscription context management.

Policy control function (PCF): PCF is responsible for user policy management.

Application function (AF): AF is responsible for user application management.

In the architecture shown in FIG. 2, the N1 interface is a reference point between the UE and the AMF; the N2 interface is a reference point of the RAN and the AMF, and is configured to transmit NAS messages, and the like; the N3 interface is a reference point between the RAN and the UPF, and is configured to transmit data on the user plane, and the like; the N4 interface is a reference point between the SMF and the UPF, and is configured to transmit information such as tunnel identification information of the N3 connection, data buffer indication information, and a downlink data notification message; and the N6 interface is a reference point between the UPF and the DN, and is configured to transmit data on the user plane, and the like. NG interface: NG interface is an interface between a RAN and a 5G core.

Figure 3:
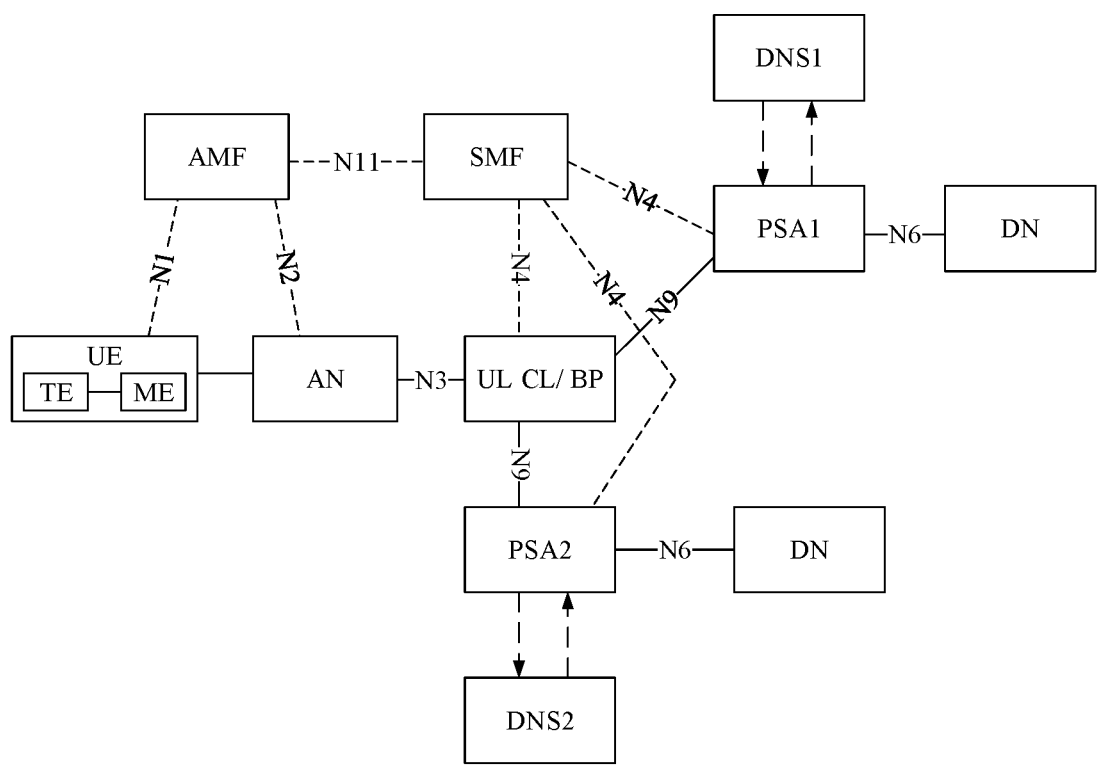
FIG. 3 is a structural block diagram of a communication system according to an embodiment of this application.

Based on FIG. 2, FIG. 3 shows a schematic diagram of a user plane architecture after the SMF is inserted into the UL CL/BP and the L-PSA. A PSA2 in FIG. 3 is an inserted L-PSA, which accesses the DN through a local connection. In the architecture shown in FIG. 3, data transmitted by the UE is offloaded through the UL CL/BP and transmitted to the L-PSA. For example, the L-PSA is the PSA2 shown in FIG. 3. The N3 interface is a reference point between the AN and the UL CL/BP, and is configured to transmit data on the user plane, and the like. The N4 interface is a reference point between the SMF and the UL CL/BP, and is configured to transmit information such as tunnel identification information of the N3 connection, data buffer indication information, and a downlink data notification message. The N6 interface is a reference point between the PSA and the DN, and is configured to transmit data on the user plane, and the like.

When the L-PSA is not inserted, the UE obtains an IP address of a first DNS server (DNS1) through the SMF, that is, an IP address of the EASDF. However, after the L-PSA is inserted, data of the UE will be offloaded to the L-PSA, so the UE can no longer access the IP address of the first DNS server EASDF. In this case, the EASDF is in an unavailable state, and the SMF needs to reassign an IP address of the second DNS server DNS2 connected to the L-PSA to the UE.

The "first DNS server EASDF" is hereinafter referred to as "first DNS server" or "EASDF". In this application, "first DNS server EASDF", "first DNS server", "DNS1" and "EASDF" refer to the same DNS server.

The "second DNS server DNS2" is hereinafter referred to as "second DNS server" or "DNS2" or "L-DNS". In this application, "second DNS server DNS2", "second DNS server", "DNS2" and "L-DNS" refer to the same DNS server.

However, for a split-UE, DNS server information provided by the SMF in the NAS message during the PDU session establishment process is provided to the ME, and the ME may not be able to provide IP parameters provided by the NAS to the TE (For example, a 5G device has a 5G access channel and can provide and share its 5G IP connection to other non-5G devices (personal computer/tablet computer/mobile phone) through wireless communication technology (Wi-Fi)). That is, since the TE and the ME are separated, the TE cannot receive IP information (for example, the 5G device cannot provide NAS-based information to the connected non-5G devices through Wi-Fi) from an EASDF of the ME. Therefore, in this application, the TE usually adopts a UP-based method to obtain IP parameter configuration from the 5G network, that is, DHCPv4 (for Internet Protocol Version 4 (IPv4)) or DHCPv6 (for Internet Protocol Version 6 (IPv6)) is used to realize the discovery and rediscovery of the DNS server. To make the discovery and rediscovery information of the DNS server provided to the UE through an NAS and through a user plane method in the same PDU session is the same, the SMF should provide an IP address of the same EASDF to the UE in a DHCP response and extended protocol configuration options (EPCO).

Referring to FIG. 3, when the L-PSA is not inserted, the DNS server information provided by the SMF to the UE through the NAS and through the user plane method is an IP address of a DNS1; and when the L-PSA is inserted, the DNS server information provided by the SMF to the UE through the NAS and through the user plane method is an IP address of the DNS2.

For example, the UE is a split-UE. The ME and the TE are connected through IP or universal serial bus (USB) or Wi-Fi, or the like. The ME can provide IP connectivity to the TE through Wi-Fi, but cannot provide NAS-based information to the TE through Wi-Fi.

The UE discovers an EAS by accessing the EASDF. After the SMF inserts the UL CL/BP and the L-PSA, data of UE will be transmitted to the L-PSA. The L-PSA cannot access the IP address of the EASDF, so the UE cannot discover the EAS through the EASDF. Although the SMF will assign a new DNS server to the UE after inserting the UL CL/BP, since information of the new DNS server assigned by the SMF is transmitted to the ME through NAS information, only the ME can receive the information of the new DNS server, and the TE that is separated from the ME but connected through IP/USB/WiFi cannot receive the information of the new DNS server. Therefore, the TE needs to obtain the information of the DNS server through a method based on the user plane. The following describes the discovery method for a DNS server proposed in this application in detail.

The names of the interfaces between various network elements in FIG. 1, FIG. 2 and FIG. 3 are merely exemplary and may be other names in a specific implementation. No specific limits are made thereto in the embodiments of this application. The names of the various network elements (such as SMF, AF, UPF) included in FIG. 1, FIG. 2 and FIG. 3 are also merely an example, and do not limit the functions of the network elements themselves. In 5GS and other future networks, the foregoing network elements may also have other names, which are not specifically limited in the embodiments of this application. For example, in the 6G network, some or all of the foregoing network elements may use the terminology in 5G, and may also use other names and the like, which is uniformly described herein, and details are not described again below. In addition, the names of the messages (or signaling) transmitted between the foregoing network elements are also merely an example, and do not constitute any limitation on the functions of the messages themselves.

Figure 4:
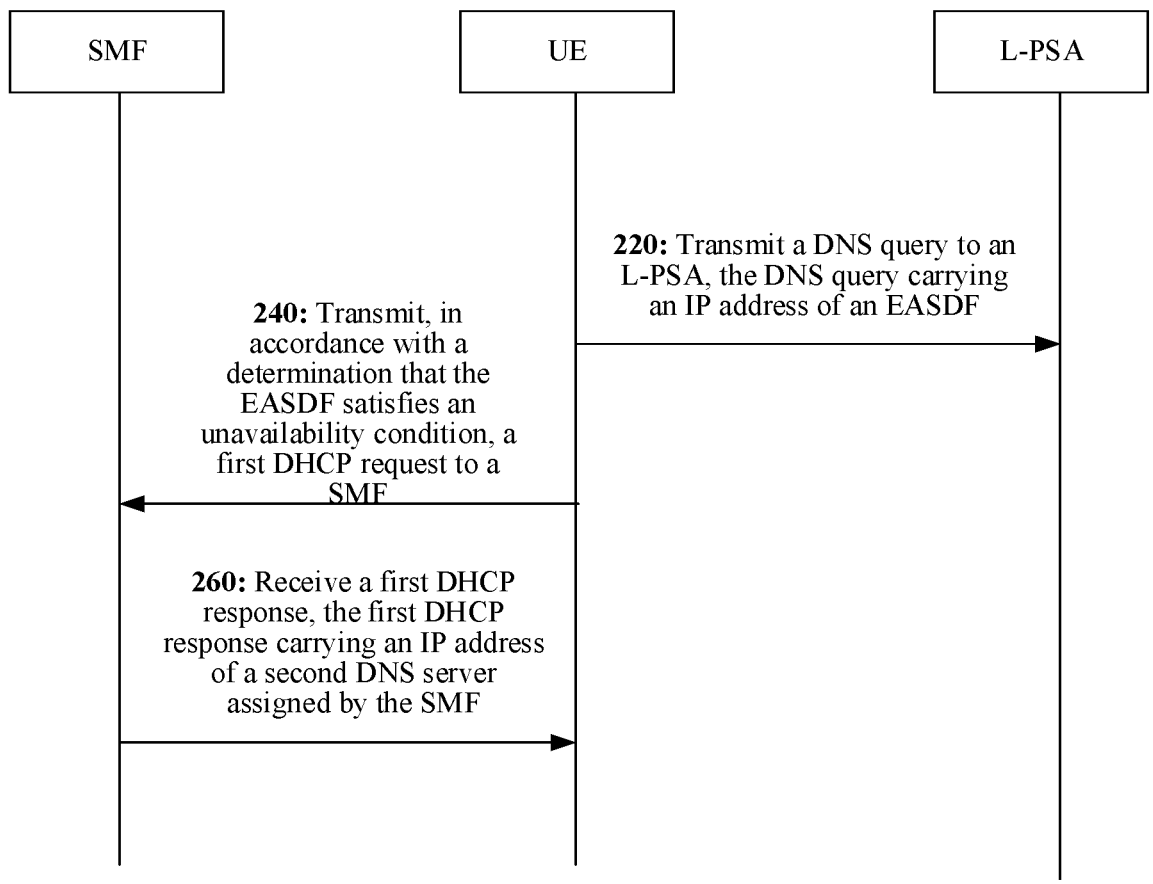
FIG. 4 is a flowchart of a discovery method for a DNS server according to an embodiment of this application.

FIG. 4 is a flowchart of a discovery method for a DNS server according to an embodiment of this application. In this embodiment, an example in which the method is applicable to UE is mainly used for description. The method includes the following steps:

Step 220: Transmit a DNS query to an L-PSA, the DNS query carrying an IP address of an EASDF.

Usually, UE discovers an EAS by transmitting a DNS query carrying the IP address of the EASDF to a PSA, and the PSA then transmits the DNS query to the EASDF according to the IP address of the EASDF.

When an SMF inserts a UL CL/BP and the L-PSA, data of UE will be offloaded and transmitted to the L-PSA. Therefore, the UE transmits the DNS query to the L-PSA, carries the IP address of the EASDF as an address of the DNS server in the DNS query, and transmits it to the L-PSA.

Step 240: Transmit, in accordance with a determination that the EASDF satisfies an unavailability condition, a first DHCP request to an SMF, the first DHCP request being used for obtaining an IP address of a second DNS server; and after the UL CL/BP is inserted, the data of the UE will be offloaded and transmitted to the L-PSA instead of the PSA. The L-PSA does not establish an access connection with the EASDF (such as a DNS1), so the UE cannot access the EASDF through the L-PSA.

For example, when the UE receives an EASDF unreachable message transmitted by the L-PSA or a network router, it is determined that the EASDF satisfies an unavailability condition. Alternatively, when no DNS response message is received within a preset duration after the DNS query is transmitted, the DNS query is re-transmitted to the L-PSA. When the re-transmission of the DNS query satisfies an abnormal condition, it is determined that the EASDF satisfies an unavailability condition.

In accordance with a determination that the EASDF satisfies the unavailability condition, the UE needs to obtain an IP address of a new DNS server. Therefore, the UE transmits the first DHCP request to the SMF.

Different DHCP requests may have different functions. In this embodiment of this application, the first DHCP request is used for obtaining the IP address of the second DNS server, and the first DHCP request information includes discovery request information of the IP address of the DNS server.

In the process that the UE obtains the IP address of the new DNS server by initiating the first DHCP request, the SMF instructs the L-PSA to forward the DHCP-related information between the UE and the SMF.

For example, in accordance with a determination that the EASDF satisfies the unavailability condition, the UE transmits the first DHCP request to the SMF, the first DHCP request is first transmitted to the L-PSA, and then the L-PSA transmits the first DHCP request to the SMF.

Step 260: Receive a first DHCP response, the first DHCP response carrying an IP address of a second DNS server assigned by the SMF.

After receiving the first DHCP request transmitted by the UE from the L-PSA, the SMF determines a second DNS server among the candidate DNS servers connected to the L-PSA and accessible to the UE, and assigns the second DNS server to the UE, and an IP address of the second DNS server is carried by a first DHCP response. After receiving the first DHCP response, the UE obtains an IP address of the second DNS server. The second DNS server is also referred to as a local DNS (L-DNS) server, for example, the L-DNS server is the DNS2.

For example, the SMF designates an L-DNS server for the UE, transmits an IP address of the L-DNS server to the L-PSA through a first DHCP response, and then the L-PSA transmits the first DHCP response to the UE. After receiving the first DHCP response, the UE obtains an IP address of the L-DNS server.

To sum up, in accordance with a determination that the EASDF satisfies an unavailability condition, the UE initiates a first DHCP request to obtain an IP address of a second DNS server reassigned by the SMF, which provides an UP-based rediscovery method for a DNS server, solving the problem that the UE (especially a split-UE) cannot access an original EASDF through the L-PSA.

The process that the UE discovers the DNS server by initiating the first DHCP request may be based on a network control, that is, the L-PSA or the network router transmits an EASDF unreachable indication message to the UE; or may be based on a UE control, that is, the UE confirms that the EASDF is unreachable by re-transmitting the DNS query.

The following first introduces specific steps of the discovery method for a DNS server based on a network control.

Figure 5:
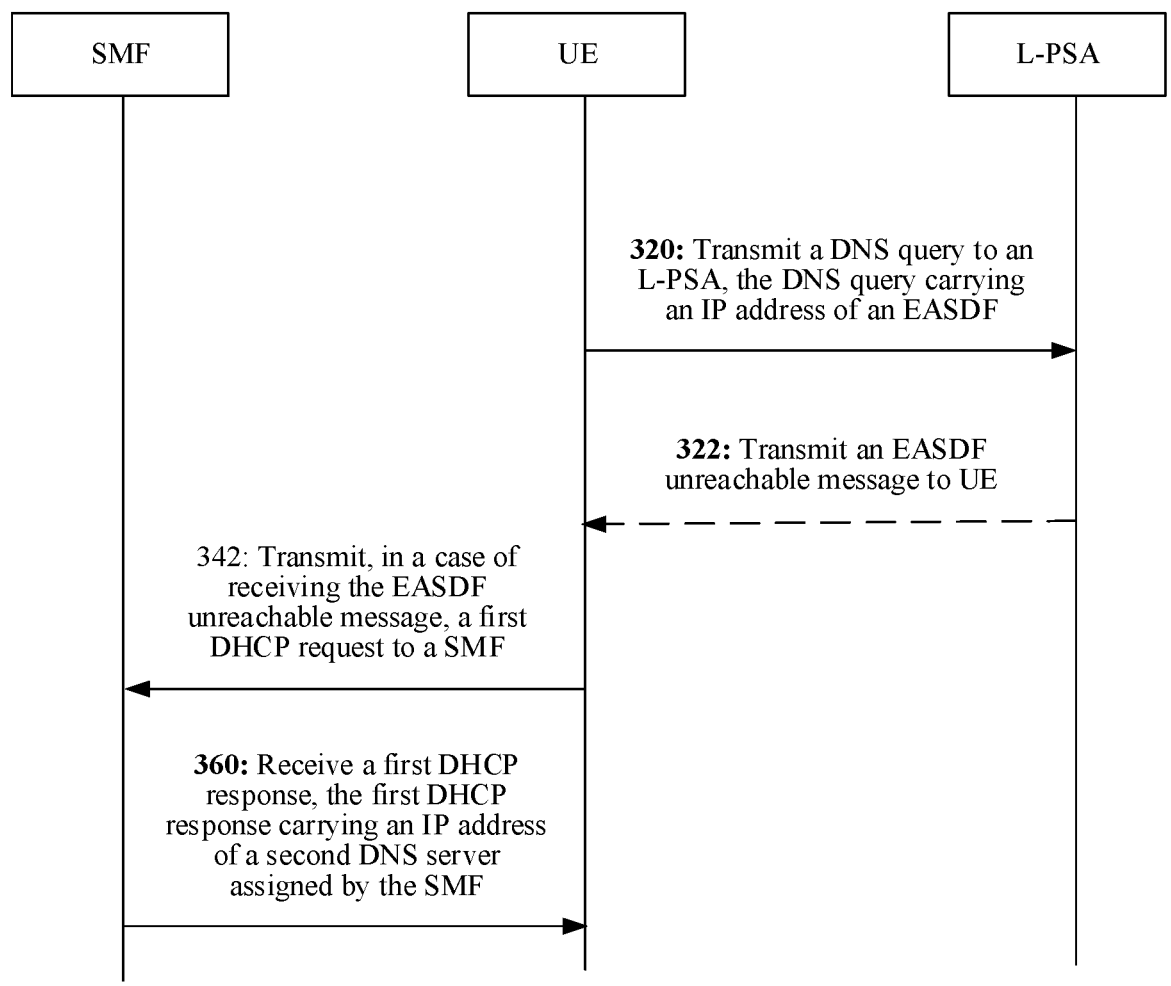
FIG. 5 is a flowchart of a discovery method for a DNS server according to an embodiment of this application.

FIG. 5 is a flowchart of a discovery method for a DNS server according to an embodiment of this application. This embodiment is described by using an example in which the method is performed by the UE, the SMF and the L-PSA. The method includes the following steps:

Step 320: UE transmits a DNS query to an L-PSA, the DNS query carrying an IP address of an EASDF.

The UE can obtain the IP address of the EASDF in the connection process of a PSA1. When an SMF inserts a UL CL/BP, data of the UE will be transmitted to the L-PSA. The UE carries the IP address of the EASDF as an address of the DNS server in the DNS query, and transmits the DNS query to the L-PSA to discover the EAS.

Step 322: The L-PSA transmits an EASDF unreachable message to the UE.

After receiving the DNS query transmitted by the UE, the L-PSA accesses according to the IP address of the EASDF carried in the DNS query, and discovers that the EASDF is unreachable. The L-PSA transmits an EASDF unreachable message to the UE.

For example, after discovering that the EASDF is unreachable according to the IP address of the EASDF carried in the DNS query information, the L-PSA transmits an ICMP message to the UE, and the ICMP message is used for indicating the EASDF unreachable message.

Step 342: Transmit, when the UE receives the EASDF unreachable message, a first DHCP request to an SMF, the first DHCP request being used for obtaining an IP address of a second DNS server.

In accordance with a determination that the EASDF satisfies the unavailability condition, the UE needs to obtain an address of a new DNS server. Therefore, the UE transmits the first DHCP request to the SMF, and the first DHCP is used for obtaining the IP address of the second DNS server.

In the process that the UE obtains the IP address of the second DNS server by initiating the first DHCP request, the SMF instructs the L-PSA to forward the DHCP information between the UE and the SMF.

For example, the UE transmits data of the first DHCP request to the L-PSA, and the L-PSA transmits the first DHCP request to the SMF.

Step 360: UE receives a first DHCP response, the first DHCP response carrying an IP address of the second DNS server assigned by the SMF.

After receiving the first DHCP request transmitted by the UE from the L-PSA, the SMF determines a second DNS server among the candidate DNS servers connected to the L-PSA and accessible to the UE, and assigns the second DNS server to the UE, and an IP address of the second DNS server is carried by a first DHCP response. After receiving the first DHCP response, the UE obtains an IP address of the second DNS server. The UE uses the IP address of the second DNS server to replace the IP address of the original first DNS server as an IP address of the DNS server for the DNS query.

For example, the SMF designates a second DNS server for the UE, transmits an IP address of the second DNS server to the L-PSA through a first DHCP response, and then the L-PSA forwards the first DHCP response to the UE. After receiving the first DHCP response, the UE obtains an IP address of a new assigned server.

To sum up, in this embodiment, the UE determines that the EASDF is unavailable by receiving an EASDF unreachable message, and rediscovers a DNS server by initiating a first DHCP request, providing a discovery method for a DNS server based on a network control. In this embodiment of this application, it can be determined that the EASDF is unavailable through an EASDF unreachable message generated by the L-PSA or the network router, which occupies very little signaling interaction resources of the system, and is simple and efficient.

Figure 6:
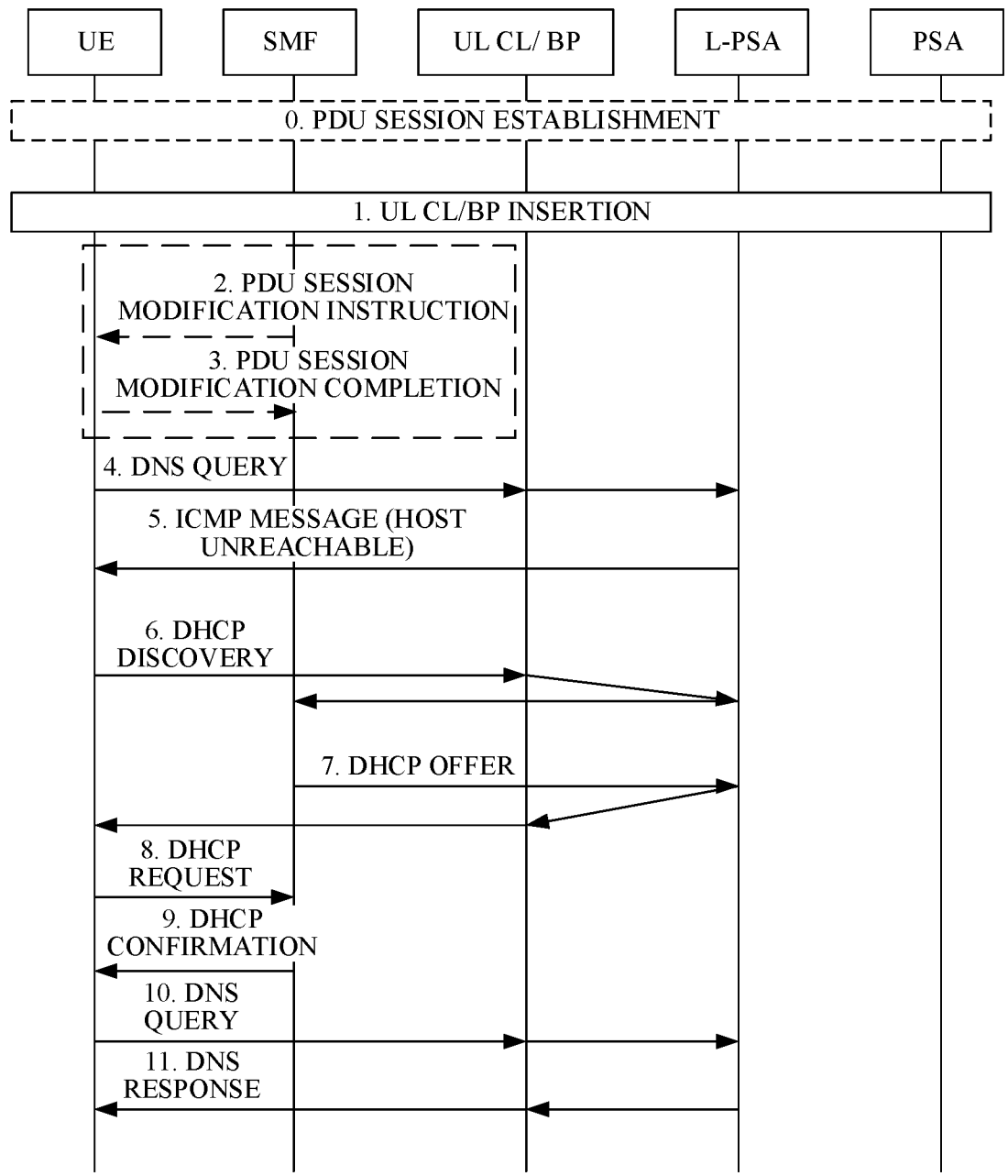
FIG. 6 is a flowchart of a discovery method for a DNS server according to an embodiment of this application.

Based on the embodiments shown in FIG. 5, FIG. 6 is a flowchart of a discovery method for a DNS server according to an embodiment of this application. The method is performed by UE, an SMF, a UL CL/BP, an L-PSA and a PSA. The method includes the following steps:

Step 0: PDU session establishment;

When a user starts to use a service application in UE, the UE establishes a PDU session for the service application.

For example, the user starts to use a service application supporting edge computing (EC) in the UE, and the UE establishes the PDU session for the service application. In addition, in this process, the UE obtains an IP address of the EASDF of the DNS server connected to the PSA.

In some embodiments, when the ME and the TE in the UE are separated, the TE may obtain the IP address of the EASDF of the foregoing DNS server through the DHCP or other ways.

Step 1: UL CL/BP Insertion DNS information transmitted by the UE triggers the insertion of the UL CL/BP and the L-PSA; or the SMF pre-establishes the UL CL/BP and the L-PSA before the UE transmits the DNS query information.

Step 2: The SMF transmits a PDU session modification instruction to the UE.

The SMF transmits the PDU session modification instruction to the UE, and the PDU session modification instruction includes an IP address of the L-DNS server.

Step 3: The UE transmits PDU session modification completion to the SMF.

After receiving the PDU session modification instruction, the UE uses the L-DNS server carried in the PDU session modification instruction as the DNS server of the PDU session. The UE transmits the PDU session modification completion to the SMF.

Step 4: The UE transmits a DNS query to the L-PSA.

When the ME is separated from the TE, the IP address of the new DNS server L-DNS provided by the SMF to the ME in step 2 cannot be passed by the ME to the TE. Therefore, in this case, the TE still uses the old DNS server, namely the EASDF, as its DNS server. Therefore, the UE transmits a DNS query carrying an IP address of the EASDF to the L-PSA.

Step 5: The L-PSA transmits an ICMP message (host unreachable) to the UE.

The L-PSA discovers that the EASDF is unreachable according to the IP address of the EASDF in the DNS query, and transmits the ICMP message to the UE. The ICMP message is used for indicating the EASDF host unreachable.

After receiving the ICMP message transmitted by the L-PSA, the UE can initiate a DNCP request in two ways. Different UEs may use different ways during execution. The two methods are respectively described below:

Manner 1: Perform the following steps 6-9, and then perform steps 10-11.

Step 6: The UE transmits a DHCP discovery request message.

After receiving the ICMP message indicating that the EASDF is unreachable transmitted by the L-PSA, the UE transmits the DHCP discovery request message to the SMF. Since the UL CL/BP is inserted and the L-PSA plays the role of forwarding, the DHCP discovery request message is transmitted to the L-PSA via the UL CL/BP, and then forwarded to the SMF by the L-PSA.

Step 7: The SMF transmits a DHCP offer message to the UE.

After receiving the DHCP discovery request message from the L-PSA, the SMF assigns an IP address to the SMF itself as an IP address of the DHCP server, which is carried in the DHCP offer message, transmitted to the L-PSA, and then forwarded to the UE by the L-PSA. Since the UL CL/BP is inserted, the DHCP message forwarded by the L-PSA is transmitted to the UE via the UL CL/BP.

Step 8: The UE transmits a DHCP request message to the SMF.

After receiving the DHCP offer message, the UE obtains an IP address of a new DHCP server provided by the SMF. The UE transmits the DHCP request message (that is, the first DHCP request in the embodiment shown in FIG. 5, the first DHCP request is used for obtaining the IP address of the second DNS server) to the IP address of the new DHCP server provided by the SMF, requesting to obtain the IP address of the DNS server.

Step 8 is similar to step 6, the DHCP offer message is transmitted to the L-PSA via the UL CL/BP, and then forwarded by the PSA to the SMF.

Step 9: The SMF transmits a DHCP confirmation message to the UE.

The SMF transmits a DHCP confirmation message to the UE (that is, the first DHCP response in the embodiment shown in FIG. 5). The DHCP confirmation message carries the IP address of the DNS server (that is, the second DNS server in the embodiment shown in FIG. 5) assigned by the SMF to the UE.

Step 9 is similar to step 7, the DHCP offer message is first transmitted to the L-PSA by the SMF, and then transmitted via the UL CL/BP to the UE.

Manner 2: Perform the following steps 6-7, and then perform steps 10-11.

Step 6: The UE transmits a DHCP discovery request message.

After receiving the ICMP message indicating that the EASDF is unreachable transmitted by the L-PSA, the UE transmits the DHCP discovery request message to the SMF. The DHCP discovery request message is used for discovering both a DHCP server and a DNS server.

For example, the DHCP discovery request message includes the first DHCP request in the embodiment shown in FIG. 5, and the first DHCP is used for obtaining the IP address of the second DNS server.

Since the UL CL/BP is inserted, the DHCP discovery request message is transmitted to the L-PSA through the UL CL/BP, and then forwarded to the SMF by the L-PSA.

Step 7: The SMF transmits a DHCP offer message to the UE.

After receiving the DHCP discovery request message, the SMF assigns an IP address to the SMF itself as an IP address of the DHCP server, which is carried in the DHCP offer message. In addition, the SMF assigns a DNS server (that is, the second DNS server in the embodiment shown in FIG. 5) connected to the L-PSA to the UE, carries an IP address of the DNS server in the DHCP offer message (that is, the first DHCP response in the embodiment shown in FIG. 5), transmits it to the L-PSA, and then forwards it to the UE by the L-PSA. Since the UL CL/BP is inserted, the DHCP message forwarded by the L-PSA is transmitted to the UE via the UL CL/BP.

In the manner 2, steps 6 and 7 can simultaneously complete discovery functions of the DHCP server and the DNS server.

For the two ways of initiating the DHCP request for obtaining the IP address of the DNS server, the following steps 10-11 are the same, and thus are described in combination.

Step 10: The UE transmits a DNS query to the L-PSA.

The UE in the manner 1 obtains the IP address of the second DNS server by receiving the DHCP confirmation message transmitted by the SMF in step 9; or the UE in the manner 2 obtains the IP address of the second DNS server by receiving the DHCP offer message transmitted by the SMF in step 7. The UE uses the IP address of the second DNS server to replace the IP address of the first DNS server as an IP address of the DNS server for the DNS query.

The UE transmits the DNS query to the L-PSA, the DNS query carrying the IP address of the foregoing second DNS server.

Step 11: The L-PSA transmits a DNS response to the UE.

After receiving the DNS query transmitted by the UE, the L-PSA accesses an IP address of the second DNS server included in the DNS query, carries a DNS resolution result obtained after the access in the DNS response, and transmits the result to the UE.

To sum up, this embodiment of this application shows in detail the discovery method for a DNS server that is jointly executed and implemented by the UE, the SMF, the UL CL/BP, the L-PSA, and the PSA. In this embodiment, the UE determines that the EASDF is unavailable by receiving an EASDF unreachable message transmitted by the L-PSA, and rediscovers a DNS server by transmitting a DHCP request for obtaining an IP address of the DNS server to the SMF, providing a discovery method for a DNS server based on a network control. In this embodiment of this application, it can be determined that the EASDF is unavailable through an EASDF unreachable message generated by the L-PSA or the network router, which is simple and efficient. In addition, for different types of UEs, the DHCP request process of the IP address of the DNS server can be obtained in different ways, having a high flexibility.

The implementation process of the discovery method for a DNS server based on a network control is described above, and specific steps of the discovery method for a DNS server based on a UE control are described below.

Figure 7:
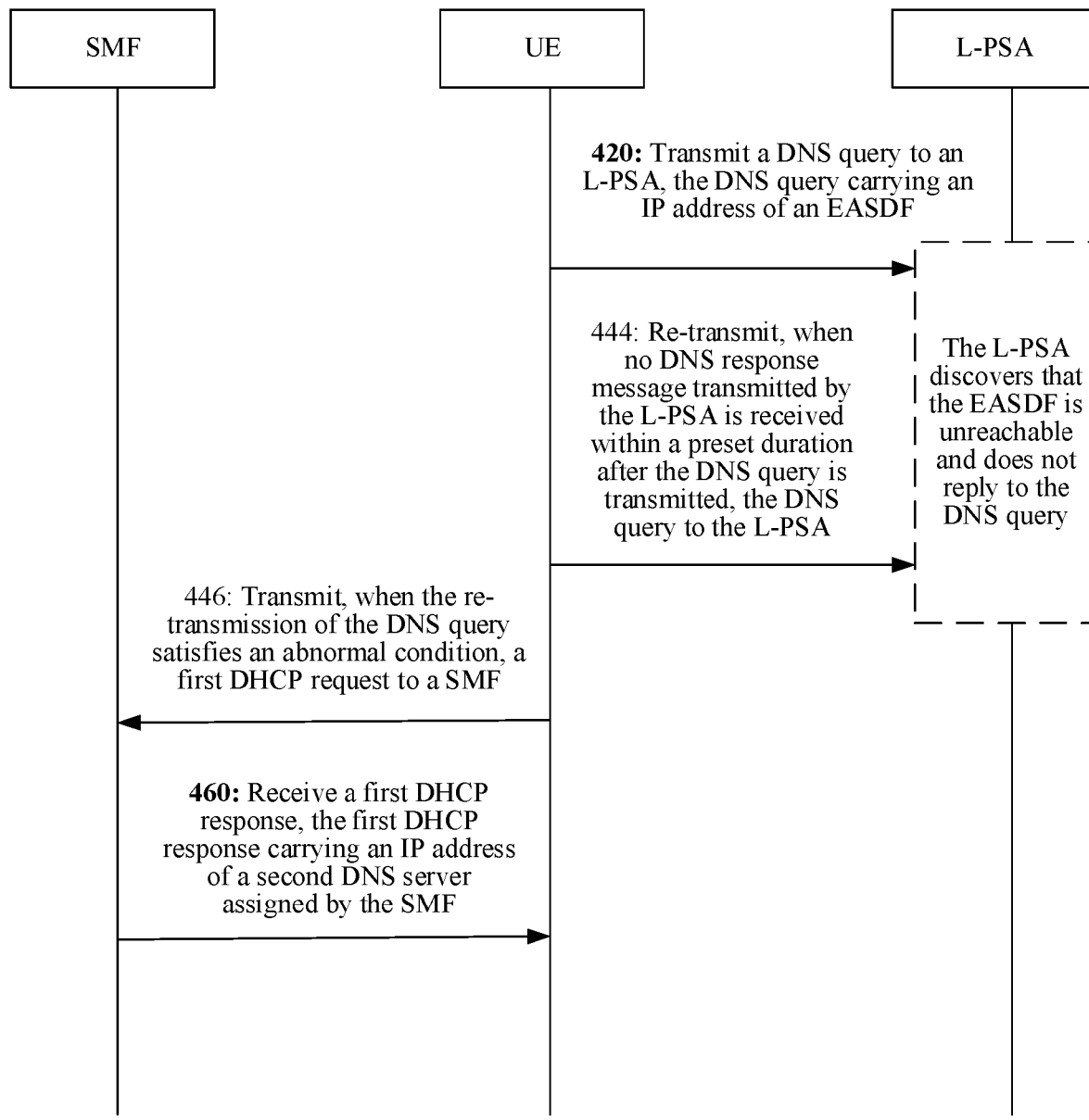
FIG. 7 is a flowchart of a discovery method for a DNS server according to an embodiment of this application.

FIG. 7 is a flowchart of a discovery method for a DNS server according to an embodiment of this application. In this embodiment, an example in which the method is applicable to UE is mainly used for description. The method includes the following steps:

Step 420: Transmit a DNS query to an L-PSA, the DNS query carrying an IP address of an EASDF.

When an SMF inserts a UL CL/BP, data of the UE will be transmitted to the L-PSA. The UE carries the IP address of the EASDF as an address of the DNS server in the DNS query, and transmits the DNS query to the L-PSA to discover the EAS.

Step 444: Re-transmit, when no DNS response message transmitted by the L-PSA is received within a preset duration after the DNS query is transmitted, the DNS query to the L-PSA.

In this embodiment of this application, in a case of discovering that the EASDF is unreachable, the L-PSA or a network router does not generate an ICMP message for indicating the EASDF unreachable message.

The preset duration is a time length value preset according to an actual situation, for example, 2 seconds, 3 seconds, and so on. When no DNS response message is received within the preset duration after the DNS query is transmitted, the DNS query is re-transmitted to the L-PSA.

The process is repeated until an abnormal condition in step 446 described below is satisfied.

For example, the preset duration is set to 2 seconds according to a network condition. When no DNS response message is received within 2 seconds after the DNS query is transmitted, the DNS query is re-transmitted to the L-PSA. The process is repeated every 2 seconds until the abnormal condition in step 446 described below is satisfied.

Step 446: Transmit, when the re-transmission of the DNS query satisfies an abnormal condition, a first DHCP request to an SMF.

The abnormal conditions for the re-transmission of the DNS query include: a quantity of re-transmissions of the DNS query reaches a first threshold; or a total duration of re-transmissions of the DNS query reaches a second threshold; or the quantity of re-transmissions of the DNS query reaches the first threshold and the total duration of re-transmissions of the DNS query reaches the second threshold.

The UE transmits, when the re-transmission of the DNS query satisfies an abnormal condition, the first DHCP request to the SMF, the first DHCP request being used for requesting the SMF to assign a second DNS server for the UE.

As an example, the first threshold is set to 5 times. The UE re-transmits the DNS query, and there is a certain time interval between every two DNS query transmissions, for example, 2 seconds. When the quantity of re-transmissions by the UE reaches 5, the UE transmits the first DHCP request to the SMF.

As another example, the second threshold is set to 10 times. The UE re-transmits the DNS query, and there is a certain time interval between every two DNS query transmissions, for example, 3 seconds. When the total duration of repeated transmissions by the UE reaches 10, the UE transmits the first DHCP request to the SMF.

As another example, the first threshold is set to 5 times and the second threshold is set to 10 times. The UE re-transmits the DNS query, and there is a certain time interval between every two DNS query transmissions, for example, 2 seconds. When the quantity of re-transmissions by the UE reaches 5 and the total duration of repeated transmissions by the UE reaches 10, UE transmits the first DHCP request to the SMF.

In the process that the UE obtains the IP address of the second DNS server by initiating the first DHCP request, the SMF instructs the L-PSA to forward the DHCP information between the UE and the SMF.

For example, the UE transmits data of the first DHCP request to the L-PSA, and the L-PSA transmits the first DHCP request to the SMF.

Step 460: Receive a first DHCP response, the first DHCP response carrying an IP address of a second DNS server assigned by the SMF.

After receiving the first DHCP request transmitted by the UE from the L-PSA, the SMF determines a second DNS server among the candidate DNS servers connected to the L-PSA and accessible to the UE, and assigns the second DNS server to the UE, and an IP address of the second DNS server is carried by a first DHCP response. After receiving the first DHCP response, the UE obtains an IP address of the second DNS server. The UE uses the IP address of the second DNS server to replace the IP address of the first DNS server as an IP address of the DNS server for the DNS query.

For example, the SMF designates a second DNS server for the UE, transmits an IP address of the second DNS server to the L-PSA through a first DHCP response message, and then the L-PSA transmits the first DHCP response message to the UE. After receiving the first DHCP response, the UE obtains an IP address of a new assigned server.

To sum up, in this embodiment of this application, the UE determines that the EASDF is unavailable by re-transmitting DNS query messages until the abnormal conditions are satisfied, and rediscovers the DNS server by initiating a first DHCP request, providing a discovery method for a DNS server controlled by the UE. This embodiment of this application can determine that the EASDF is unavailable by re-transmitting DNS query information until the abnormal conditions are satisfied, thereby providing a simple discovery method for a DNS server.

Figure 8:
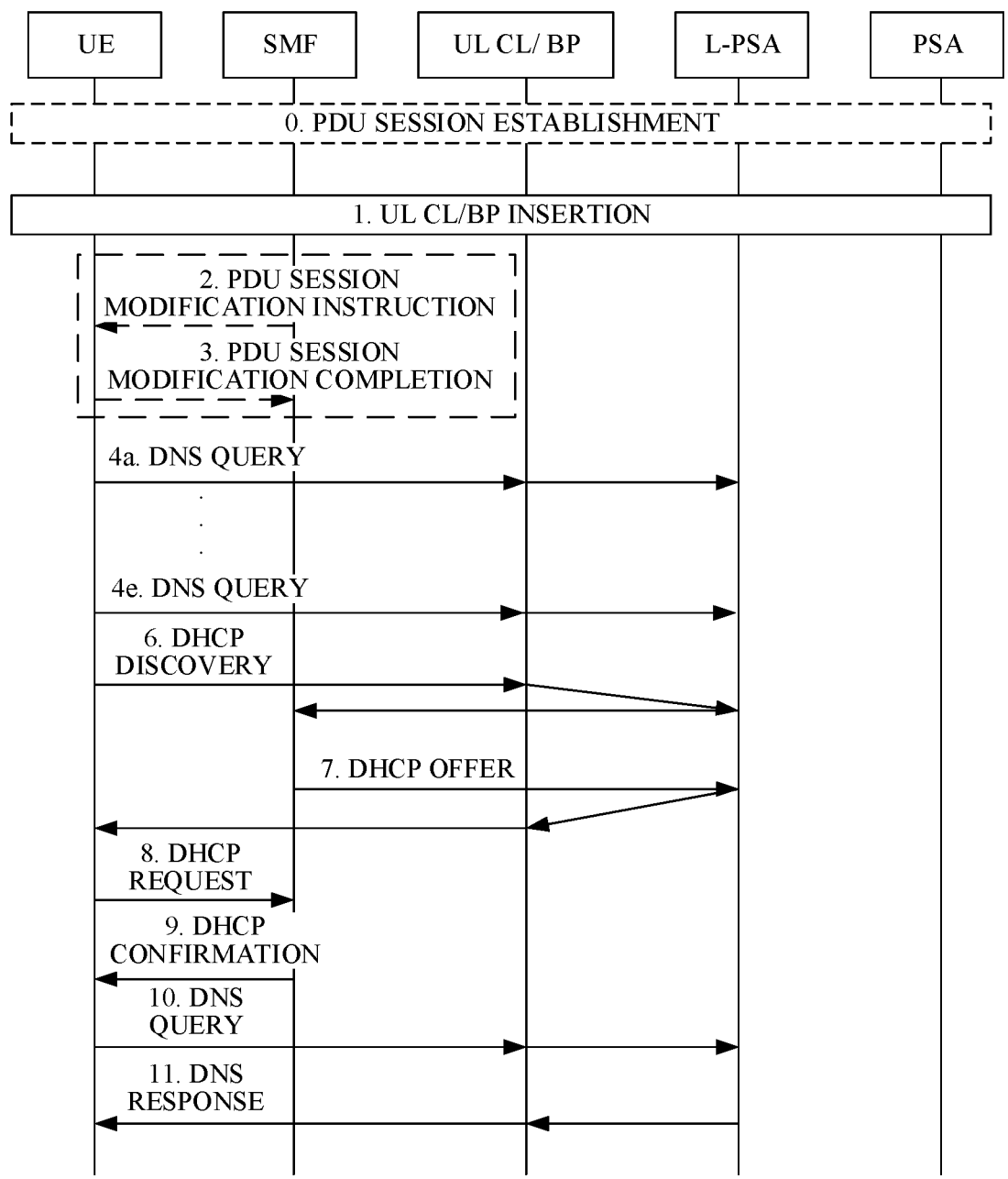
FIG. 8 is a flowchart of a discovery method for a DNS server according to an embodiment of this application.

Based on some embodiments shown in FIG. 7, FIG. 8 is a flowchart of a discovery method for a DNS server according to an embodiment of this application. The method is performed by UE, an SMF, a UL CL/BP, an L-PSA and a PSA. The method includes the following steps:

Step 0: PDU session establishment;

When a user starts to use a service application in UE, the UE establishes a PDU session for the service application.

For example, the user starts to use a service application supporting edge computing (EC) in the UE, and the UE establishes the PDU session for the service application. In addition, in this process, the UE obtains an IP address of the EASDF of the DNS server connected to the PSA.

In some embodiments, When the ME in the UE is separated from the TE, the TE may obtain the IP address of the EASDF of the aforementioned DNS server by means such as DHCP.

Step 1: UL CL/BP Insertion

DNS information transmitted by the UE triggers the insertion of the UL CL/BP and the L-PSA; or the SMF pre-establishes the UL CL/BP and the L-PSA before the UE transmits the DNS query information.

Step 2: The SMF transmits a PDU session modification instruction to the UE.

The SMF transmits the PDU session modification instruction to the UE, and the PDU session modification instruction includes an IP address of the L-DNS server.

Step 3: The UE transmits the PDU session modification completion to the SMF.

After receiving the PDU session modification instruction, the UE uses the L-DNS server carried in the PDU session modification instruction as the DNS server of the PDU session. The UE transmits the PDU session modification completion to the SMF.

Step 4: The UE transmits a DNS query to the L-PSA.

When the ME is separated from the TE, the IP address of the new DNS server L-DNS provided by the SMF to the ME in step 2 cannot be passed by the ME to the TE. Therefore, in this case, the TE still uses the old DNS server, namely the EASDF, as its DNS server. Therefore, the UE transmits a DNS query carrying an IP address of the EASDF to the L-PSA.

In this embodiment, when it is discovered that the EASDF is unreachable, the L-PSA does not generate an ICMP message for indicating the EASDF unreachable message. Therefore, the UE re-transmits the DNS query to the L-DNS until the abnormal condition is satisfied.

The abnormal conditions include: a quantity of re-transmissions of the DNS query reaches a first threshold; or a total duration of re-transmissions of the DNS query reaches a second threshold; or the quantity of re-transmissions of the DNS query reaches the first threshold and the total duration of re-transmissions of the DNS query reaches the second threshold.

For example, steps 4a to 4e are used for instructing the UE to re-transmit the DNA query to the L-PSA 5 times to satisfy the abnormal condition.

When the L-PSA in the discovery method for a DNS server based on a UE control discovers that the EASDF is unreachable, no ICMP message will be generated. To compare with the discovery method for a DNS server based on a network control, the label in step 5 is skipped in this embodiment.

When the UE re-transmits the DNS query to the L-PSA to satisfy the abnormal condition, the DNCP request can be initiated in two ways. Descriptions are provided separately below.

Manner 1: Perform the following steps 6-9, and then perform steps 10-11.

Step 6: The UE transmits a DHCP discovery request message.

After receiving the ICMP message indicating that the EASDF is unreachable transmitted by the L-PSA, the UE transmits the DHCP discovery request message to the SMF. Since the UL CL/BP is inserted and the L-PSA plays the role of forwarding, the DHCP discovery request message is transmitted to the L-PSA via the UL CL/BP, and then forwarded to the SMF by the L-PSA.

Step 7: The SMF transmits a DHCP offer message to the UE.

After receiving the DHCP discovery request message from the L-PSA, the SMF assigns an IP address to the SMF itself as an IP address of the DHCP server, which is carried in the DHCP offer message, transmitted to the L-PSA, and then forwarded to the UE by the L-PSA. Since the UL CL/BP is inserted, the DHCP message forwarded by the L-PSA is transmitted to the UE via the UL CL/BP.

Step 8: The UE transmits a DHCP request message to the SMF.

After receiving the DHCP offer message, the UE obtains an IP address of a new DHCP server provided by the SMF. The UE transmits the DHCP request message (that is, the first DHCP request in the embodiment shown in FIG. 7, the first DHCP request is used for obtaining the IP address of the second DNS server) to the IP address of the new DHCP server provided by the SMF, requesting to obtain the IP address of the DNS server.

Step 8 is similar to step 6, the DHCP offer message is transmitted to the L-PSA via the UL CL/BP, and then forwarded by the PSA to the SMF.

Step 9: The SMF transmits a DHCP confirmation message to the UE.

The SMF transmits a DHCP confirmation message to the UE (that is, the first DHCP response in the embodiment shown in FIG. 7). The DHCP confirmation message carries the IP address of the DNS server (that is, the second DNS server in the embodiment shown in FIG. 7) assigned by the SMF to the UE.

Step 9 is similar to step 7, the DHCP offer message is first transmitted to the L-PSA by the SMF, and then transmitted via the UL CL/BP to the UE.

Manner 2: Perform the following steps 6-7, and then perform steps 10-11.

Step 6: The UE transmits a DHCP discovery request message.

After receiving the ICMP message indicating that the EASDF is unreachable transmitted by the L-PSA, the UE transmits the DHCP discovery request message to the SMF.

The DHCP discovery request message is used for discovering both a DHCP server and a DNS server.

For example, the DHCP discovery request message includes the first DHCP request in the embodiment shown in FIG. 7, and the first DHCP is used for obtaining the IP address of the second DNS server.

Since the UL CL/BP is inserted, the DHCP discovery request message is transmitted to the L-PSA through the UL CL/BP, and then forwarded to the SMF by the L-PSA.

Step 7: The SMF transmits a DHCP offer message to the UE.

After receiving the DHCP discovery request message, the SMF assigns an IP address to the SMF itself as an IP address of the DHCP server, which is carried in the DHCP offer message. In addition, the SMF assigns a DNS server (that is, the second DNS server in the embodiment shown in FIG. 7) connected to the L-PSA to the UE, carries an IP address of the DNS server in the DHCP offer message (that is, the first DHCP response in the embodiment shown in FIG. 7), transmits it to the L-PSA, and then forwards it to the UE by the L-PSA. Since the UL CL/BP is inserted, the DHCP message forwarded by the L-PSA is transmitted to the UE via the UL CL/BP.

In the manner 2, steps 6 and 7 can simultaneously complete discovery functions of the DHCP server and the DNS server.

For the two ways of initiating the DHCP request for obtaining the IP address of the DNS server, the following steps 10-11 are the same, and thus are described in combination.

Step 10: The UE transmits a DNS query to the L-PSA.

The UE in the manner 1 obtains the IP address of the second DNS server by receiving the DHCP confirmation message transmitted by the SMF in step 9; or the UE in the manner 2 obtains the IP address of the second DNS server by receiving the DHCP offer message transmitted by the SMF in step 7. The UE uses the IP address of the second DNS server to replace the IP address of the old EASDF as an IP address of the DNS server for the DNS query.

The UE transmits the DNS query to the L-PSA, the DNS query carrying the IP address of the foregoing second DNS server.

Step 11: The L-PSA transmits a DNS response to the UE.

After receiving the DNS query transmitted by the UE, the L-PSA accesses an IP address of the second DNS server included in the DNS query, carries a DNS resolution result obtained after the access in the DNS response, and transmits the result to the UE.

To sum up, this embodiment shows in detail the discovery method for a DNS server that is jointly executed and implemented by the UE, the SMF, the UL CL/BP, the L-PSA, and the PSA. In this embodiment, the UE determines that the EASDF is unavailable by receiving an EASDF unreachable message transmitted by the L-PSA, and rediscovers a DNS server by transmitting a DHCP request for obtaining an IP address of the DNS server to the SMF, providing a discovery method for a DNS server based on a network control. This embodiment of this application can determine that the EASDF is unavailable by re-transmitting DNS query information until the abnormal condition is satisfied, which is very simple. In addition, for different types of UEs, the DHCP request process of the IP address of the DNS server can be obtained in different ways, having a high flexibility.

The discovery method for a DNS server in the foregoing embodiments are based on a network control and a UE control, respectively. Considering the unreliability of the ICMP transmission process, the two methods based on a network control and a UE control are combined. The following embodiments demonstrate a discovery method for a DNS server based on a composite approach.

Figure 9:
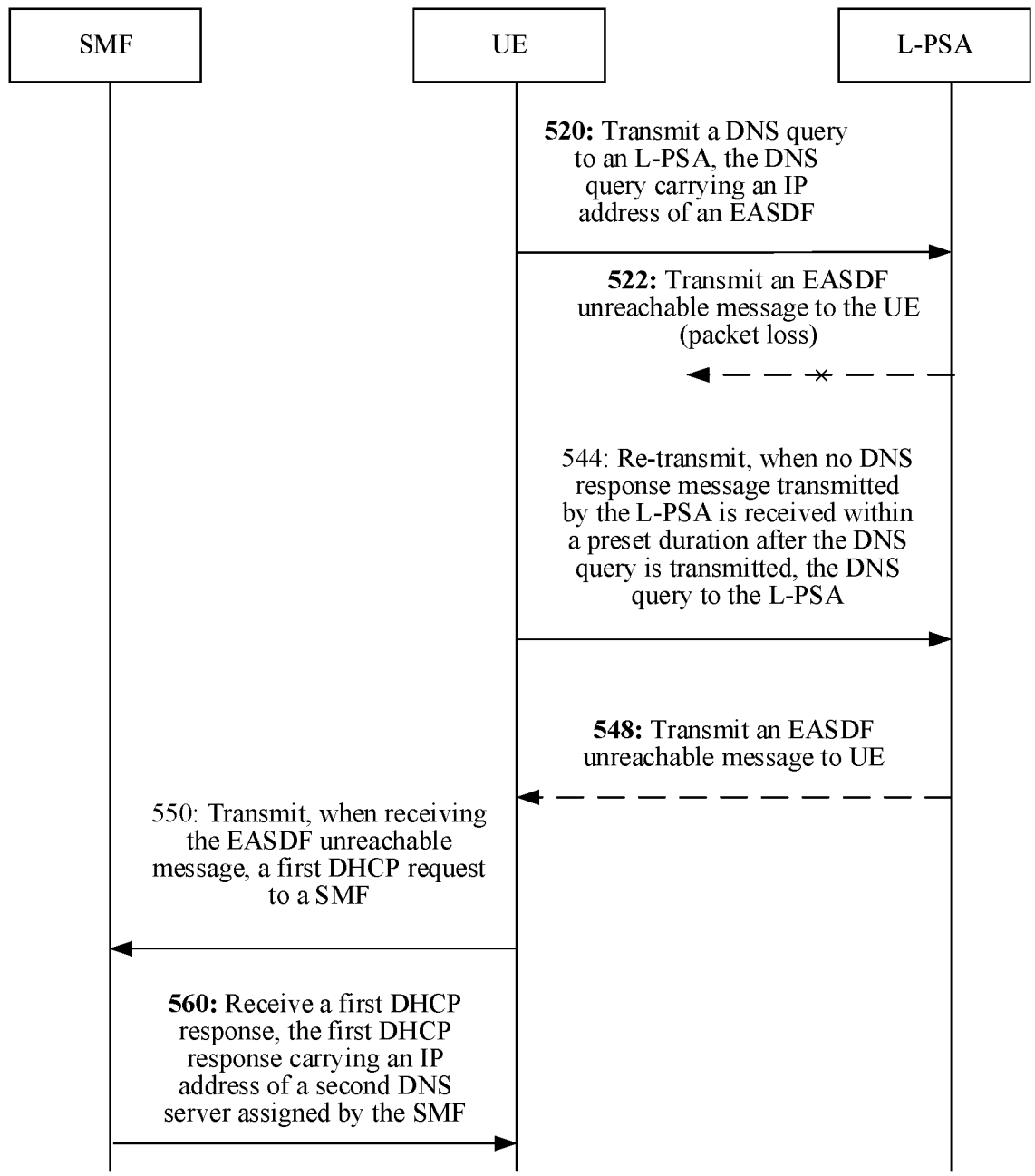
FIG. 9 is a flowchart of a discovery method for a DNS server according to an embodiment of this application.

FIG. 9 is a flowchart of a discovery method for a DNS server according to an embodiment of this application. This embodiment is described by using an example in which the method is performed by UE and a L-PSA. The method includes the following steps:

Step 520: Transmit a DNS query to an L-PSA, the DNS query carrying an IP address of an EASDF.

When an SMF inserts a UL CL/BP, data of the UE will be transmitted to the L-PSA. The UE carries the IP address of the EASDF as an address of the DNS server in the DNS query, and transmits the DNS query to the L-PSA to discover the EAS.

Step 522: Transmit an EASDF unreachable message to the UE.

The L-PSA accesses the EASDF according to the IP address of the EASDF carried in the received DNS query message, and discovers that the EASDF is unreachable. The L-PSA transmits an ICMP message for indicating the EASDF unreachable message to the UE.

The ICMP message is encapsulated in an IP datagram for transmission, so ICMP message transmission cannot guarantee transmission reliability.

For example, in step 522, after discovering that the EASDF is unreachable according to the IP address of the EASDF carried in the DNS query information, the L-PSA transmits an ICMP message to the UE, and the ICMP message is used for indicating the EASDF unreachable message. The ICMP message is lost during transmission, and the UE cannot receive the ICMP message transmitted by the L-PSA.

Step 544: Re-transmit the DNS query to the L-PSA when no DNS response message transmitted by the L-PSA is received within a preset duration after the DNS query is transmitted.

The preset duration is a time length value preset according to an actual situation, for example, 2 seconds, 3 seconds, and so on. When no DNS response message transmitted by the L-PSA is received within the preset duration after the DNS query is transmitted, the DNS query is re-transmitted to the L-PSA.

For example, a maximum preset duration for the UE to receive the DNS response message is 2 seconds. When no DNS response message transmitted by the L-PSA is received within 2 seconds after the UE transmits the DNS query, the UE re-transmits the DNS query to the L-PSA.

Step 548: Transmit an EASDF unreachable message to the UE.

The L-PSA accesses the EASDF according to the IP address of the EASDF carried in the received DNS query message, and discovers that the EASDF is unreachable. The L-PSA re-transmits an ICMP message for indicating the EASDF unreachable message to the UE.

Step 550: The UE transmits, when the EASDF unreachable message is received, the first DHCP request to the SMF.

When the UE receives the EASDF unreachable message transmitted by the L-PSA, it is determined that the EASDF is unreachable, and does not re-transmit the DNS query to the L-PSA.

To obtain a new DNS server, the UE transmits the first DHCP request to the SMF, and the first DHCP is used for obtaining the IP address of the second DNS server.

Step 560: Receive a first DHCP response, the first DHCP response carrying an IP address of a second DNS server assigned by the SMF.

After receiving the first DHCP request transmitted by the UE, the SMF determines a second DNS server among the candidate DNS servers connected to the L-PSA and accessible to the UE, and an IP address of the second DNS server is carried by a first DHCP response and transmitted to the UE. After receiving the first DHCP response, the UE obtains an IP address of the second DNS server. The UE uses the IP address of the second DNS server to replace the IP address of the first DNS server as an IP address of the DNS server for the DNS query.

For example, the SMF designates a DNS server for the UE, transmits an IP address of the DNS server to the L-PSA through a DHCP response message, and then the L-PSA transmits the DHCP response message to the UE. After receiving the DHCP response, the UE obtains an IP address of a new DNS server. The UE uses the IP address of the second DNS server to replace the IP address of the first DNS server as an IP address of the DNS server for the DNS query.

Figure 10:
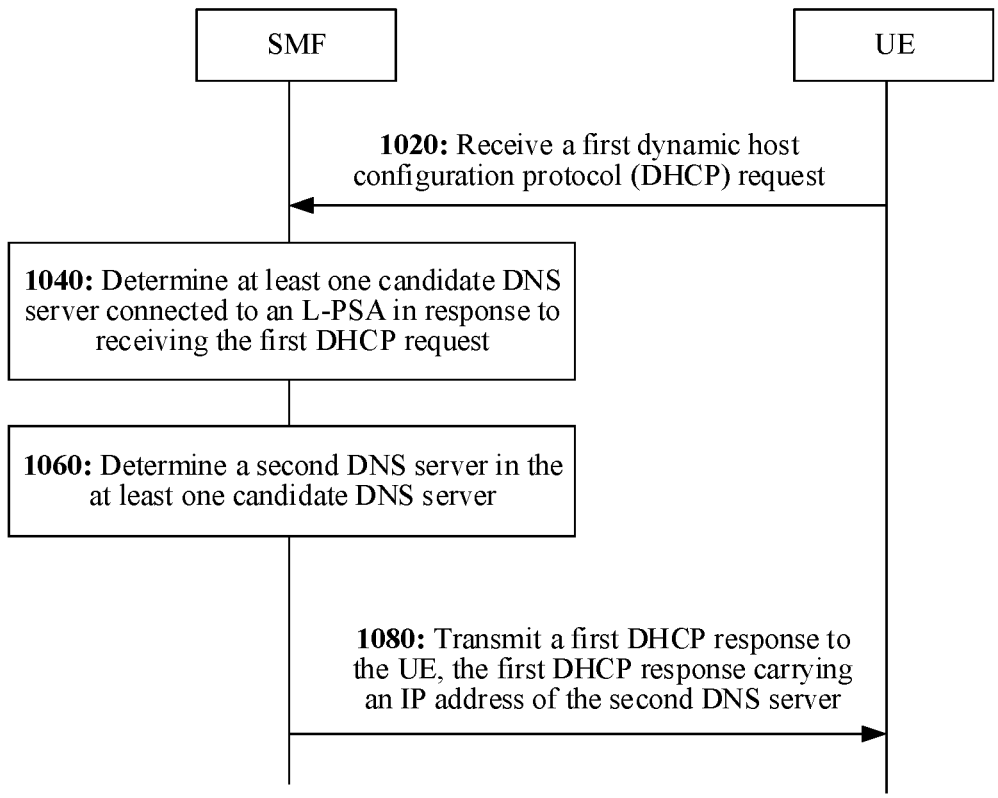
FIG. 10 is a flowchart of an assignment method for a DNS server according to embodiment of this application.

FIG. 10 is a flowchart of an assignment method for a DNS server according to embodiment of this application. This embodiment is described by using an example in which the method is performed by an SMF. The method includes the following steps:

Step 1020: Receive a first dynamic host configuration protocol (DHCP) request.

The DHCP request is forwarded, in a case of determining that an EASDF satisfies an unavailability condition, by UE through an L-PSA to an SMF, and the first DHCP request is used for obtaining an IP address of a second DNS server.

For example, when the UE receives an EASDF unreachable message transmitted by the L-PSA or a network router, it is determined that the EASDF satisfies an unavailability condition. The UE forwards the first DHCP request used for obtaining an IP address of a DNS server to the SMF through the L-PSA. The SMF receives the first DHCP request, and assigns a second DNS server to the UE that initiates the first DHCP request in the following steps.

For example, when no DNS response message is received within a preset duration after the DNS query is transmitted, the DNS query is re-transmitted to the L-PSA. In addition, when the re-transmission of the DNS query satisfies an abnormal condition, it is determined that the EASDF satisfies an unavailability condition. The UE forwards the first DHCP request used for obtaining an IP address of a second DNS server to the SMF through the L-PSA. The SMF receives the first DHCP request, and assigns a second DNS server to the UE that initiates the first DHCP request in the following steps.

Step 1040: Determine at least one candidate DNS server connected to the L-PSA in response to receiving the first DHCP request.

After receiving the first DHCP request, the SMF determines at least one candidate DNS server connected to the L-PSA and accessible to the UE.

Usually, the UE can access any DNS server connected to the L-PSA. There may be individual cases where the UE cannot access the DNS server connected to the L-PSA, which is not limited in this application. In this application, an example in which the UE can access any DNS server connected to the L-PSA is used.

The SMF obtains information of the at least one DNS server connected to the L-PSA, and determines the server as a candidate DNS server.

Step 1060: Determine a second DNS server in the at least one candidate DNS server.

The second DNS server is a DNS server that is finally assigned to the UE.

Various manners may be adopted for determining the second DNS server in the at least one candidate DNS server, for example, in a random manner; or in a polling manner.

For example, the SMF determines the second DNS server in the at least one candidate DNS server in a random manner. The SMF determines m DNS servers connected to the L-PSA, randomly selects one DNS server from the m DNS servers, determines the server as the second DNS server, and assigns the server to the UE, where m is an integer greater than or equal to 1.

For example, the SMF determines the second DNS server in the at least one candidate DNS server in a polling manner. The SMF determines m DNS servers connected to the L-PSA, and the SMF receives first DHCP requests initiated by the n UEs. For a first DHCP request initiated by an $i^{th}$ UE among the n UEs, the SMF selects an $i^{th}$ DNS server among the m DNS servers as the second DNS server, and assigns the server to an $i^{th}$ UE, where m and n are both integers greater than or equal to 1, and i is a positive integer less than or equal to n.

In some embodiments, before the SMF receives the first DHCP request, the step of determining the second DNS server in the at least one candidate DNS server has been performed and transmitted to the UE through an NAS message. After receiving the first DHCP request, the SMF determines the second DNS server among the at least one candidate DNS server in a manner consistent with historical steps, and transmits an IP address of the second DNS server to the UE through a first DHCP response. The SMF adopts the same execution steps to obtain the second DNS server, so as to ensure that the second DNS servers obtained by the UE through an NAS method and based on a UP method are the same.

Step 1080: Transmit a first DHCP response to the UE, the first DHCP response carrying the IP address of the second DNS server.

After determining the second DNS server assigned to the UE, the SMF transmits the first DHCP response to the UE, and the first DHCP response carries an IP address of the second DNS server.

For example, the SMF determines the second DNS server, transmits the IP address of the second DNS server to the L-PSA through a DHCP response message, and then the L-PSA transmits the DHCP response message to the UE. After receiving the DHCP, the UE obtains the IP address of the L-DNS server.

Figure 11:
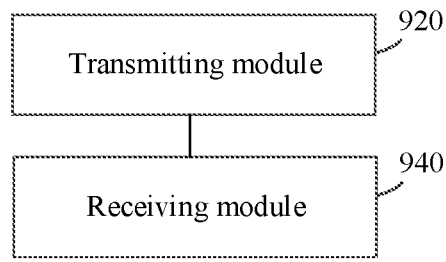
FIG. 11 is a block diagram of a discovery apparatus for a DNS server according to an embodiment of this application.

FIG. 11 is a block diagram of a discovery apparatus for a DNS server according to an embodiment of this application. The apparatus may be applicable to a UE or implemented as a part of the UE. The apparatus includes:

a transmitting module 920, configured to transmit a DNS query to an L-PSA, the DNS query carrying an IP address of an EASDF; and configured to transmit, in accordance with a determination that the EASDF satisfies an unavailability condition, a first DHCP request to an SMF, the first DHCP request being used for obtaining an IP address of a second DNS server; and a receiving module 940, configured to receive a first DHCP response, the first DHCP response carrying an IP address of the second DNS server assigned by the SMF.

In some embodiments, the transmitting module 920 is further configured to transmit, when the EASDF unreachable message transmitted by the L-PSA is received, the first DHCP request to the SMF.

In some embodiments, the transmitting module 920 is further configured to transmit, when an ICMP message transmitted by the L-PSA is received and the ICMP message is used for indicating the EASDF unreachable message, the first DHCP request to the SMF.

In some embodiments, the transmitting module 920 is further configured to re-transmit, when no DNS response message is received within a preset duration after the DNS query is transmitted, the DNS query to the L-PSA; and transmit, when the re-transmission of the DNS query satisfies an abnormal condition, the first DHCP request to the SMF.

In some embodiments, the transmitting module 920 is further configured to transmit, when a quantity of re-transmissions of the DNS query reaches a first threshold, the first DHCP request to the SMF; or transmit, when a total duration of re-transmissions of the DNS query reaches a second threshold, the first DHCP request to the SMF; or transmit, when the quantity of re-transmissions of the DNS query reaches the first threshold and the total duration of re-transmissions of the DNS query reaches the second threshold, the first DHCP request to the SMF.

In some embodiments, the transmitting module 920 is further configured to re-transmit, when no DNS response message is received within a preset duration after the DNS query is transmitted, the DNS query to the L-PSA; and transmit, when the EASDF unreachable message transmitted by the L-PSA is received, the first DHCP request to the SMF.

In some embodiments, the transmitting module 920 is further configured to transmit, when an ICMP message transmitted by the L-PSA is received and the ICMP message is used for indicating the EASDF unreachable message, the first DHCP request to the SMF.

Figure 12:
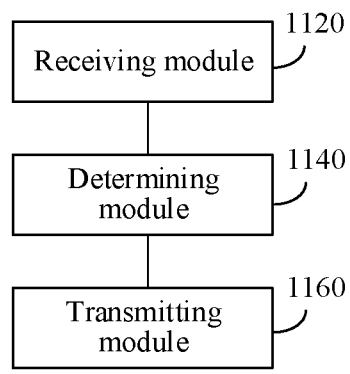
FIG. 12 is a block diagram of an assignment apparatus for a DNS server according to an embodiment of this application.

FIG. 12 is a block diagram of an assignment apparatus for a DNS server according to an embodiment of this application. The apparatus may be applicable to an SMF or implemented as a part of the SMF. The apparatus includes:

a receiving module 1120, configured to receive a first dynamic host configuration protocol (DHCP) request, the first DHCP request being forwarded, in accordance with a determination that an edge application server discovery function (EASDF) first DNS server satisfies an unavailability condition, by user equipment (UE) through a local protocol data unit session anchor (L-PSA) to an SMF, and the first DHCP request being used for obtaining an Internet Protocol (IP) address of the DNS server;

a determining module 1140, configured to determine at least one candidate DNS server connected to the L-PSA in response to receiving the first DHCP request; and determine the second DNS server in the at least one candidate DNS server, the second DNS server being a DNS server assigned to the UE; and a transmitting module 1160, configured to transmit a first DHCP response to the UE, the first DHCP response carrying the IP address of the second DNS server.

In some embodiments, the determining module 1140 is further configured to determine the second DNS server in the at least one candidate DNS server in a random manner.

In some embodiments, the determining module 1140 is further configured to determine the second DNS server in the at least one candidate DNS server in a polling manner.

Figure 13:
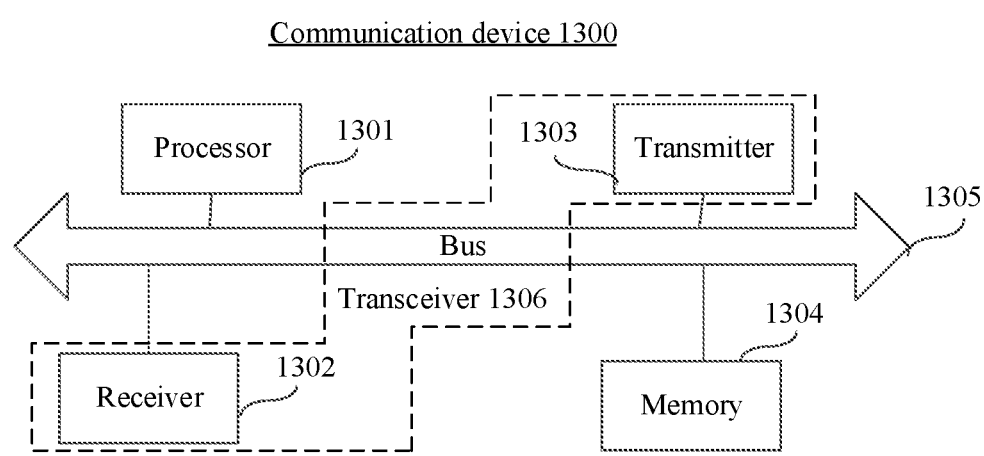
FIG. 13 is a schematic structural diagram of a computer device according to an embodiment of this application.

FIG. 13 is a schematic structural diagram of a communication device according to an embodiment of this application. For example, the communication device may be configured to perform the discovery method for a DNS server or the assignment method for a DNS server described above. Specifically, the communication device 1300 may include: a processor 1301, a receiver 1302, a transmitter 1303, a memory 1304, and a bus 1305.

The processor 1301 includes one or more processing cores, and the processor 1301 performs various functional applications and information processing by running a software program and module.

The receiver 1302 and the transmitter 1303 may be implemented as a transceiver 1306, which may be a communication chip.

The memory 1304 is connected to the processor 1301 through the bus 1305.

The memory 1304 may be configured to store a computer program, and the processor 1301 is configured to execute the computer program to implement each step executed by the access network entity or the core network entity in the foregoing method embodiments.

The transmitter 1303 is configured to perform steps related to transmissions in the foregoing embodiments; the receiver 1302 is configured to perform steps related to reception in the foregoing embodiments; and the processor 1301 is configured to perform other steps except transmitting and receiving steps in the foregoing embodiments.

In addition, the memory 1304 may be implemented by any type of volatile or non-volatile storage device or a combination thereof. The volatile or non-volatile storage device includes, but not limited to, a random-access memory (RAM), a read-only memory (ROM), an erasable programmable ROM (EPROM), an electrically erasable programmable ROM (EEPROM), a flash memory or another solid-state memory technology, a compact disc read-only memory (CD-ROM), a digital versatile disc (DVD) or another optical memory, a tape cartridge, a magnetic cassette, a magnetic disk memory, or another magnetic storage device.

A terminal is further provided in an exemplary embodiment, including: a processor and a memory, the memory storing a computer program, the computer program being loaded and executed by the processor to implement the discovery method for a DNS server or the assignment method for a DNS server described above.

This application further provides a non-transitory computer-readable storage medium, storing at least one instruction, at least one program, a code set, or an instruction set, the at least one instruction, the at least one program, the code set, or the instruction set being loaded and executed by a processor to implement the discovery method for a DNS server or the assignment method for a DNS server provided in the foregoing method embodiments.

In accordance with some embodiments of this application, a computer program product is provided. The computer program product includes computer instructions that are stored in a non-transitory computer-readable storage medium. A processor of a computer device reads the computer instructions from the computer-readable storage medium, and executes the computer instructions, so that the computer device performs the discovery method for a DNS server or the assignment method for a DNS server according to the foregoing aspects.

The sequence numbers of the foregoing embodiments of this application are merely for description purpose, and do not indicate the preference among the embodiments.

A person of ordinary skill in the art may understand that all or some of steps of the embodiments may be implemented by hardware or a program instructing related hardware. The program may be stored in a computer-readable storage medium. The storage medium mentioned above may be a ROM, a magnetic disk or an optical disc.

The foregoing descriptions are merely exemplary embodiments of this application, but are not intended to limit this application. Any modification, equivalent replacement, or improvement made within the spirit and principle of this application shall fall within the protection scope of this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the pre-defined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs transmission and/or receiving. In practical application, the foregoing functions may be allocated to and completed by different functional modules according to requirements, that is, an inner structure of a device is divided into different functional modules to implement all or a part of the functions described above.

What is claimed is:

1. A discovery method for a domain name system (DNS) server, the method comprising:
    transmitting a DNS query to a local protocol data unit session anchor (L-PSA), the DNS query carrying an Internet Protocol (IP) address of a first DNS server edge application server discovery function (EASDF);
    in response to a determination that the first DNS server EASDF satisfies an unavailability condition, transmitting a first dynamic host configuration protocol (DHCP) request to a session management function (SMF), wherein the first DHCP request is used for obtaining an IP address of a second DNS server; and
    receiving a first DHCP response, the first DHCP response carrying an IP address of the second DNS server assigned by the SMF.

2. The method according to claim 1, wherein transmitting the first DHCP request to the SMF comprises:
    transmitting the first DHCP request to the SMF when a first DNS server EASDF unreachable message is received.

3. The method according to claim 2, wherein transmitting the first DHCP request to the SMF when the first DNS server EASDF unreachable message is received comprises:
    transmitting the first DHCP request to the SMF when an Internet Control Message Protocol (ICMP) message is received and the ICMP message is used for indicating the first DNS server EASDF unreachable message.

4. The method according to claim 1, wherein transmitting the first DHCP request to the SMF comprises:
in accordance with a determination that no DNS response message is received within a preset duration after the DNS query is transmitted, re-transmitting the DNS query to the L-PSA; and
in accordance with a determination that the re-transmission of the DNS query satisfies an abnormal condition, transmitting the first DHCP request to the SMF.

5. The method according to claim 4, wherein transmitting the first DHCP request to the SMF comprises one of:
transmitting, when a quantity of re-transmissions of the DNS query reaches a first threshold, the first DHCP request to the SMF; or
transmitting, when a total duration of re-transmissions of the DNS query reaches a second threshold, the first DHCP request to the SMF; or
transmitting, when the quantity of re-transmissions of the DNS query reaches the first threshold and the total duration of re-transmissions of the DNS query reaches the second threshold, the first DHCP request to the SMF.

6. The method according to claim 1, wherein transmitting the first DHCP request to the SMF comprises:
re-transmitting the DNS query to the L-PSA when no DNS response message is received within a preset duration after the DNS query is transmitted; and
transmitting the first DHCP request to the SMF, when a first DNS server EASDF unreachable message is received.

7. The method according to claim 6, wherein transmitting the first DHCP request to the SMF comprises:
when an ICMP message is received and the ICMP message is used for indicating the first DNS server EASDF unreachable message, transmitting the first DHCP request to the SMF.

8. The method according to claim 1, wherein transmitting the DNS query to the L-PSA comprises:
generating the DNS query based on the IP address of the first DNS server EASDF; and
transmitting, when the SMF inserts an uplink classifier/branching point, the DNS query to the L-PSA.

9. A computer device, comprising:
one or more processors; and
memory storing one or more programs, the one or more programs comprising instructions that, when executed by the one or more processors, cause the one or more processors to perform operations comprising:
transmitting a domain name system (DNS) query to a local protocol data unit session anchor (L-PSA), the DNS query carrying an Internet Protocol (IP) address of a first DNS server edge application server discovery function (EASDF);
in response to a determination that the first DNS server EASDF satisfies an unavailability condition, transmitting a first dynamic host configuration protocol (DHCP) request to a session management function (SMF), wherein the first DHCP request is used for obtaining an IP address of a second DNS server; and
receiving a first DHCP response, the first DHCP response carrying an IP address of the second DNS server assigned by the SMF.

10. The computer device according to claim 9, wherein transmitting the first DHCP request to the SMF comprises:
transmitting the first DHCP request to the SMF when a first DNS server EASDF unreachable message is received.

11. The computer device according to claim 10, wherein transmitting the first DHCP request to the SMF when the first DNS server EASDF unreachable message is received comprises:
transmitting the first DHCP request to the SMF when an Internet Control Message Protocol (ICMP) message is received and the ICMP message is used for indicating the first DNS server EASDF unreachable message.

12. The computer device according to claim 9, wherein transmitting the first DHCP request to the SMF comprises:
in accordance with a determination that no DNS response message is received within a preset duration after the DNS query is transmitted, re-transmitting the DNS query to the L-PSA; and
in accordance with a determination that the re-transmission of the DNS query satisfies an abnormal condition, transmitting the first DHCP request to the SMF.

13. The computer device according to claim 12, wherein transmitting the first DHCP request to the SMF comprises one of:
transmitting, when a quantity of re-transmissions of the DNS query reaches a first threshold, the first DHCP request to the SMF; or
transmitting, when a total duration of re-transmissions of the DNS query reaches a second threshold, the first DHCP request to the SMF; or
transmitting, when the quantity of re-transmissions of the DNS query reaches the first threshold and the total duration of re-transmissions of the DNS query reaches the second threshold, the first DHCP request to the SMF.

14. The computer device according to claim 9, wherein transmitting the first DHCP request to the SMF comprises:
re-transmitting the DNS query to the L-PSA when no DNS response message is received within a preset duration after the DNS query is transmitted; and
transmitting the first DHCP request to the SMF, when a first DNS server EASDF unreachable message is received.

15. The computer device according to claim 14, wherein transmitting the first DHCP request to the SMF comprises:
when an ICMP message is received and the ICMP message is used for indicating the first DNS server EASDF unreachable message, transmitting the first DHCP request to the SMF.

16. The computer device according to claim 9, wherein transmitting the DNS query to the L-PSA comprises:
generating the DNS query based on the IP address of the first DNS server EASDF; and
transmitting, when the SMF inserts an uplink classifier/branching point, the DNS query to the L-PSA.

17. A non-transitory computer-readable storage medium, storing one or more instructions, the one or more instructions, when executed by one or more processors of a computer device, cause the computer device to perform operations comprising:
transmitting a domain name system (DNS) query to a local protocol data unit session anchor (L-PSA), the DNS query carrying an Internet Protocol (IP) address of a first DNS server edge application server discovery function (EASDF);
in response to a determination that the first DNS server EASDF satisfies an unavailability condition, transmitting a first dynamic host configuration protocol (DHCP) request to a session management function (SMF), wherein the first DHCP request is used for obtaining an IP address of a second DNS server; and receiving a first DHCP response, the first DHCP response carrying an IP address of the second DNS server assigned by the SMF.

18. The non-transitory computer-readable storage medium according to claim 17, wherein transmitting the first DHCP request to the SMF comprises:

transmitting the first DHCP request to the SMF when a first DNS server EASDF unreachable message is received.

19. The non-transitory computer-readable storage medium according to claim 18, wherein transmitting the first DHCP request to the SMF when the first DNS server EASDF unreachable message is received comprises:

transmitting the first DHCP request to the SMF when an Internet Control Message Protocol (ICMP) message is received and the ICMP message is used for indicating the first DNS server EASDF unreachable message.

20. The non-transitory computer-readable storage medium according to claim 17, wherein transmitting the first DHCP request to the SMF comprises:

in accordance with a determination that no DNS response message is received within a preset duration after the DNS query is transmitted, re-transmitting the DNS query to the L-PSA; and in accordance with a determination that the re-transmission of the DNS query satisfies an abnormal condition, transmitting the first DHCP request to the SMF.

\* \* \* \* \*